United States Patent

[11] 3,633,618

[72] Inventors Joseph J. Blackmore
R.R. #1, Edwardsville, Ill. 62025;
Perry G. Glunt, 91 Wildwood Lane,
Kirkwood, Mo. 63122
[21] Appl. No. 14,398
[22] Filed Feb. 26, 1970
[45] Patented Jan. 11, 1972

[54] VALVED MANIFOLD FOR GAUGING A PLURALITY OF FLUID PRESSURES
5 Claims, 1 Drawing Fig.

[52] U.S. Cl............................................. 137/597,
73/420, 137/557, 251/321
[51] Int. Cl..................................................... G01l 7/00,
F16k 37/00, F16k 3/28
[50] Field of Search............................................. 73/420, 4
R; 251/321; 137/493, 597

[56] References Cited
UNITED STATES PATENTS

| | | | | |
|---|---|---|---|---|
| 3,413,855 | 12/1968 | Bloom | | 73/420 |
| 2,508,231 | 5/1950 | DeFrees | | 137/608 X |
| 2,598,961 | 6/1952 | Andrus | | 137/608 |
| 3,148,700 | 9/1964 | Friedell | | 251/322 X |
| 3,077,102 | 2/1963 | Greer et al. | | 73/4 R |
| 3,463,010 | 8/1969 | Hatschek | | 73/420 X |
| 2,243,801 | 5/1941 | Gregory | | 137/608 X |

Primary Examiner—Louis R. Prince
Assistant Examiner—Daniel M. Yasich
Attorney—Jerome A. Gross ABSTRACT: A simply constructed valved manifold permits a single fluid pressure gauge to show, selectively, a number of sources of fluid pressure. The manifold is a block having a longitudinal bore to which the gauge is connected. A plurality of crossbores, each terminating in a counterbore, intersect the longitudinal bore. Gas-free liquid connections are maintained from each counterbore through its crossbore, into the longitudinal bore and to the pressure gauge. A valve stem extends through each crossbore. When a valve stem is momentarily pressed to open, the pressure in the manifold will adjust itself to equal the source of pressure so opened to it; and the gauge will continue to show that pressure until one of the valve stems is again pressed to open position.

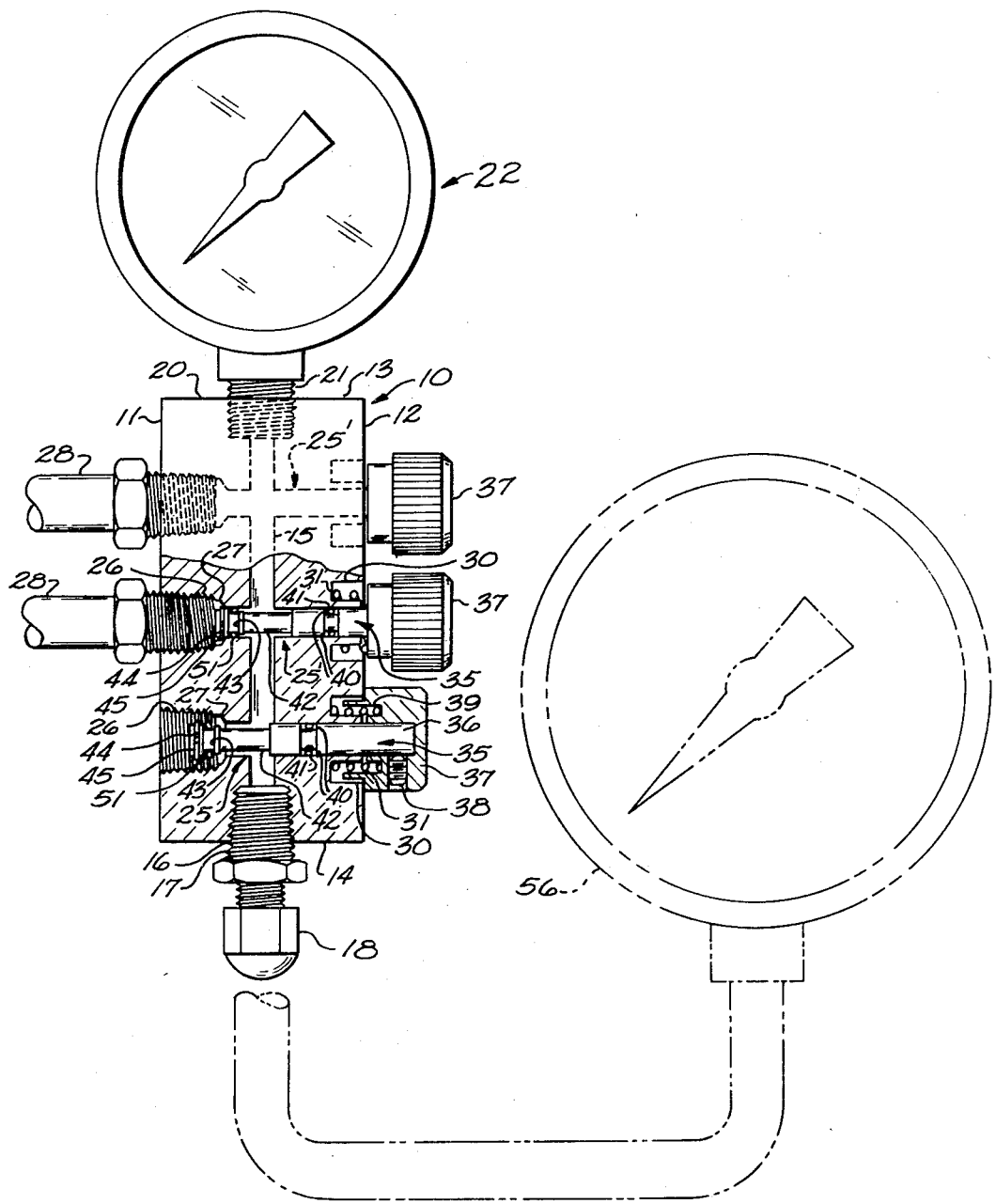

VALVED MANIFOLD FOR GAUGING A PLURALITY OF FLUID PRESSURES

BACKGROUND OF THE INVENTION

The present invention relates to the gauging of pressures, and particularly to gauging, selectively and individually, a plurality of sources of liquid pressure with a single pressure gauge.

In systems such as those which circulate water under pressure, it may be important to ascertain precise pressures in several parts of the system. As examples, comparing the pressures at the pressure side and the suction side of a pump will disclose how it is functioning; and an excessive drop across a strainer in the system may indicate blockage. To use separate pressure gauges at each such point is disadvantageous; even expensive gauges will not be and remain calibrated with each other, and a comparison of their readings may lead to false conclusions.

SUMMARY OF THE INVENTION

The purposes of the present invention include providing a simply constructed valved manifold at whose outlet a single pressure gauge is connected, which permits the quick taking of readings of a plurality of sources of pressure, through which there is no liquid flow, and which need not be vented between readings. A further purpose is to provide a method for using a single highly accurate pressure gauge selectively to gauge a plurality of sources of liquid pressure. Other purposes will be apparent from the detailed description herein.

Briefly summarized, a valved manifold is constructed of a block having a longitudinal bore terminating in a bore outlet which has means to attach such a pressure gauge. Across the manifold block extend a plurality of crossbores which intersect the longitudinal bore; each crossbore ends in a counterbore to which is connected one of the sources of pressure. A valve stem through each crossbore bears valving mechanism, including a first O-ring to seal the crossbore portion remote from the counterbore, a second O-ring which moves out of the crossbore into the counterbore for opening and returns into it for closing; and a projecting key which serves as a stop to limit closing movement.

According to the method of the present invention, gas-free liquid connections are made from sources of pressure, at each counterbore, through the adjacent valved portions of the crossbores and into the longitudinal bore. When only one crossbore is open, so that all but one of such sources of pressure are shut off by the sealing engagement of the second O-rings within the ends of the other crossbores, the pressure in the manifold will adjust itself to equal that of the one source of pressure open to the manifold. This pressure will remain in the manifold after that valve has closed. When the valve to another source of pressure is opened, the manifold pressure will readjust itself, increasingly or decreasingly, to equal it. The same liquid remains in the manifold at all times.

BRIEF DESCRIPTION OF THE DRAWINGS

The drawing is a view, partly in elevation and partly broken away, of a valved manifold embodying the present invention, for connection to a plurality of pressure sources. A simple pressure gauge is shown in solid lines. Attachment of a second gauge for testing is shown in phantom lines.

DESCRIPTION OF THE PREFERRED EMBODIMENT

The basic element of the valve manifold shown in the drawings is a manifold block generally designated 10, which may be machined from brass of sufficient thickness, say three-fourths inch, to accommodate the parts and functions described herein. The manifold block 10 has longitudinal parallel left and right surfaces 11, 12 and terminates in upper and lower edge surfaces 13, 14.

A longitudinal bore 15 extends lengthwise vertically through the manifold block 10 at its midthickness. It terminates in the lower surface 14 in a secondary pressure outlet 16, which is tapped to receive a threaded coupling 17 normally sealedly capped by a cap nut 18. At the upper edge surface 13, the bore 15 has a similarly capped principal pressure outlet 20 which receives a short threaded tube 21 onto which a principal pressure gauge generally designated 22 is mounted.

Bored horizontally through the block, at its midthickness so as to extend between the left and right side edges 11, 12 and intersect the longitudinal bore 15, are three crossbores generally designated 25. Each has sunk within the left edge surface 11, a counterbore 26 terminating in a shoulderlike counterbore end surface 27. Each counterbore 26 has tapped threads, so as to serve as means to make an inlet connection from a separate source of fluid pressure, through a typical inlet connector 28.

Within the right edge 12, annular spring seats 30 are machined concentric with the crossbores 25. Into each seat 30 is fitted a spiral compression spring 31.

A metal valve stem generally designated 35 passes through each of the crossbores 25. Onto the upper end 36 of each stem 35 is an actuating knob 37, held by a set screw 38. An annular groove 39 in the under side of each actuating knob 37 fits over its compression spring 31, so that the spring will urge the stem 35 to the left, which is its closed position, as shown at the middle of FIG. 1.

The stems 35 are preferably machined from round rod stock whose diameter is nearly that of the crossbores 25. The stem portion extending between the bore 15 and the right surface 12 has a circumferential seal-seating groove 40 in which a first O-ring seal 41 is received. To the left of the portion so grooved and extending toward the left end to be described, each stem 35 has a broad circumferential groove 42, which may be considered as pressure-communicating portion of lesser radial extent. Beyond it is another circumferential seal-seating groove 43 for a second O-ring seal 51. A final narrow groove 44 is grasped by a spring key 45 or anchor ring, which projects radially outward within the counterbore 26 to serve as stop means which limits the closing movement of the stem 35.

The function of the first O-ring seal 41, which seals the portion of the crossbore 25 to the right of the longitudinal bore 15, is conventional. As to the second O-ring seal 51, it functions both as a seal and as a valving member, to seal within the left end of the crossbore 25. When the valve stem 35 is in closed position, as shown at the midlevel of FIG. 1, it seals the portion of the crossbore 25 to the left of the longitudinal bore 15, thus sealing the manifold block 10 at that point. When an actuating knob 37 is pressed inward, as in the case of the lowermost shown in FIG. 1, the second O-ring seal 51 on its stem 35 is driven out of the crossbore 25 and into the counterbore 26. This movement establishes pressure communication from a source of fluid pressure connected to the inlet connector 28, through the flow-passing groove 42 to the longitudinal bore 15 and thus to the pressure gauge 22.

Releasing the actuating knob 37 causes its spring 31 to draw the stem 35 to the right, drawing the second O-ring seal 51 back from the counterbore 26 to seal within the bore portion 25. The projecting spring key 45 serves as a positive stop, when it abuts the counterbore end surface 27, to limit the movement of the stem 35 to the right. Alternately the second O-ring seal 51 may be of such large diameter that it cannot fully enter into the crossbore 25, in which case it will be compressed at its juncture with the counterbore end surface 27, to seal there and serve as its own stop means.

In ordinary use, the assembled valve manifold is mounted on the bracket, not shown, and three sources of liquid pressure are connected through inlet connectors 28 screwed into its counterbores 26. The bore 15 and crossbores 25, which constitute a manifold, which are permitted to fill with liquid so that it is gas-free to the pressure gauge 22. Then all of the actuating knobs 37 are released, shutting off the sources of liquid pressure.

To measure one of the inlet pressures on the single pressure gauge 22, one of the actuating knobs 37 is momentarily pressed to open position; the pressure within the manifold will, without any substantial flow of liquid, adjust itself to equal that one source of pressure. Releasing the actuating knob 37 cuts off that source of pressure but permits the pressure to remain in the manifold and on the gauge 22. When it is desired to measure a second pressure source, the actuating knob 37 for that pressure source is momentarily depressed; immediately the pressure within the manifold will readjust itself to equal that of the second source of pressure and the gauge will reflect it. Thus, pressures are communicated to the manifold, and not a flow of liquid.

Comparison of two pressures by their readings on a single pressure gauge 22 is inherently much more accurate than the comparison of readings of two separate gauges; any error in calibration is not likely to have a significant effect on the difference between its two readings. The present invention makes it economical to employ a single good-quality gauge. Should it be desired to check its accuracy or calibrate it at any time, the capnut 18 may be removed and a test gauge 56 connected, as shown in phantom lines.

A unique advantage of the present construction is its ease of manufacture. A manifold may be constructed to reflect as many sources of pressure as are desired to be gauged, without substantial increase in cost.

We claim:

1. For use with a pressure gauge,
a valved manifold for gauging, selectively and individually, a plurality of sources of fluid pressure, comprising
  a manifold block having
    a longitudinal bore terminating in an outlet, the outlet having connector means to attach such a pressure gauge, the manifold block further having
    a plurality of parallel crossbores extending through the block from a first edge thereof to an opposite edge, each crossbore intersecting the longitudinal bore and comprising
      a first crossbore portion extending from said first edge of the block to the longitudinal bore, and
      a second crossbore portion aligned axially with said first crossbore portion and extending from the longitudinal bore to a juncture with an inlet counterbore formed in said opposite edge of the block,
  each counterbore having means to make an inlet connection from one of said sources of fluid pressures,
  a valve stem reciprocable within each crossbore and extending through both its first crossbore portion and second crossbore portion and into its counterbore and there having means to seat the stem sealedly at the juncture of the counterbore with said second crossbore portion,
  each valve stem further having
    first means to seal between the stem and the first crossbore portion, spring means to bias the stem axially to closed position, and manually depressable means, adjacent to said first edge of the block, to overcome said spring means and to unseat the said means to seat the stem,
  whereby to provide pressure communication from a selected source of fluid pressure through such inlet connection into the counterbore of one of said second crossbore portions and thence, through said second crossbore portion and longitudinal bore, to such pressure gauge.

2. A valved manifold as defined in claim 6, wherein the means to seat each stem sealedly comprises
  stop means affixed to the stem within the counterbore, and
  second means to seal mounted on the stem inwardly adjacent to the stop means, and making sealing contact between the stem and second crossbore portion when the stem is in closed position,
  said second means to seal being displaced into the counterbore when the stem is depressed.

3. A valved manifold as defined in claim 7, wherein the second means to seal in an O-ring mounted on each stem inwardly adjacent to its stop means, the O-ring having an outer diameter, when uncompressed, greater than that of the second crossbore portion,
  whereby, on closing, to be drawn from the counterbore into and compressively to seal the second crossbore portion under the biasing force of the spring means.

4. A valved manifold as defined in claim 1, wherein
  the first means to seal is a first O-ring mounted in such position on each stem as to seal the first crossbore portion throughout such range of axial movement of the stem, and
  the second means to seal is an O-ring mounted on each stem inwardly adjacent to its stop means, and
  the stem has a flow-passing portion of lesser radial extent inward of said second means to seal, and
  the stop means is a spring key affixed to the stem, whereby the stem may be machined from round rod stock.

5. A valved manifold as defined in claim 1, wherein
the longitudinal bore has a second outlet opposite the first outlet, and has
  a removable cap therefor, and
  connector means thereat,
  whereby, on removal of such cap, a supplementary test gauge may be connected to said connector means to verify the readings of the pressure gauge.

* * * * *